C. E. TALMON.
SPOOL HOLDER.
APPLICATION FILED MAR. 21, 1911.

1,006,702.

Patented Oct. 24, 1911.

Witnesses
F. C. Barry

Inventor
Charlie E. Talmon

By
Attorneys

UNITED STATES PATENT OFFICE.

CHARLIE E. TALMON, OF BERRIEN SPRINGS, MICHIGAN.

SPOOL-HOLDER.

1,006,702.  Specification of Letters Patent.  Patented Oct. 24, 1911.

Application filed March 21, 1911. Serial No. 615,922.

*To all whom it may concern:*

Be it known that I, CHARLIE E. TALMON, a citizen of the United States, residing at Berrien Springs, in the county of Berrien and State of Michigan, have invented certain new and useful Improvements in Spool-Holders, of which the following is a specification.

This invention relates to spool holders which are adapted to be worn by a person when sewing, and it has for its object to provide a holder of this kind which can be readily attached to, and removed from, a person's garment, and also to provide means whereby the spool can be readily placed in the holder and removed therefrom.

The invention also has for its object to provide a structure whereby the spool is held spaced from the garment so that it may turn freely when in use.

Figure 1:
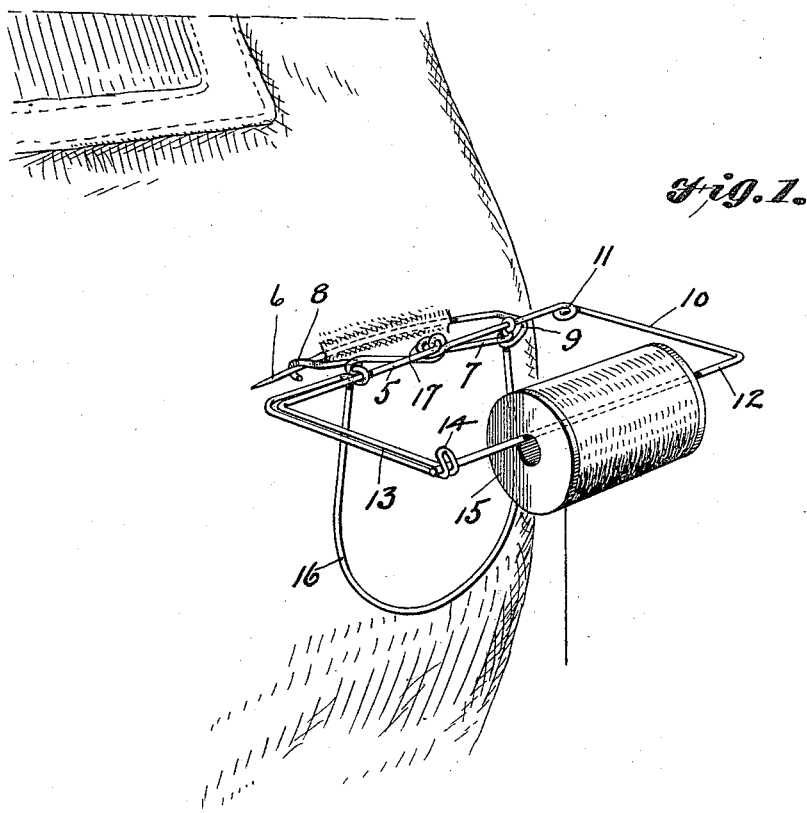
Figure 2:
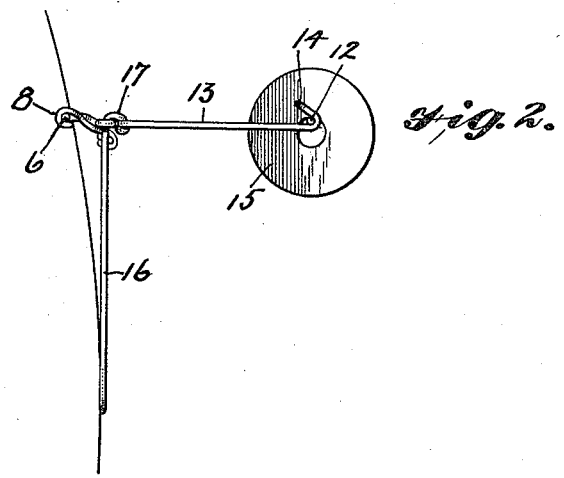

In the accompanying drawing forming a part of this specification, Figure 1 is a perspective view of the holder, and Fig. 2 is a side elevation thereof.

Referring specifically to the drawing, the holder comprises a shank 5 which is provided with a pin for attaching the device to the garment of a person. The shank is also provided with a holder for the spool. The attaching pin is shown at 6, it being in the form of a safety pin. This pin is formed at one end of a shank 7 attached to the shank 5, the other end of said shank 7 having a guard 8 for the point of the pin. The pin is joined to the shank 7 by a spring loop 9. The holder or support for the spool is formed by making an outward bend 10 at one end of the shank 5, said bend being joined to the shank by a spring loop 11, and at the extremity of the bend is a lateral bend 12 extending parallel to the shank 5. From the other end of the shank 5 extends an outward bend 13 at right angles thereto, at the extremity of which bend is a guard 14 for holding the free end of the bend 12. This structure is also similar to a safety pin, the bend 12 corresponding to the pin, and serving as a spindle on which the spool 15 is mounted, the spindle passing loosely through the hole in the spool so that the latter can turn freely thereon. To mount the spool on the spindle, the latter is disengaged from the guard 14, and after the spool has been positioned on the spindle, the latter is engaged with the guard 14, whereupon the spool is held in place and prevented from slipping off.

As already described, the pin 6 is employed for attaching the device to the garment of the user, in view of which it is always at hand. Whenever thread is required, all the wearer needs to do is to seize the free end thereof and draw the desired amount from the spool.

In order to hold the spool away from the garment of the wearer there is provided a loop 16 projecting downwardly from the shank 5. The pins 6 and 12 are located on opposite sides of the shank 5 in the same plane, and the loop 16 extends at a right angle to said plane. When the device is in position for use, this loop engages the garment of the wearer and thus holds the spool spaced therefrom, in view of which it will turn freely when the thread is withdrawn.

The device is formed of two pieces of wire bent to form the several parts herein described. As shown in the drawing, the shank 5, the spool holder proper, and the loop 16 are formed of one of the pieces of wire. One end of the wire is the pin or spindle 12, the same being joined to the shank by the bend 10 and the spring loop 11. The shank is bent intermediate its ends into a loop 17, and at the end of the shank, opposite the end which carries the pin or spindle, the bend 13 is made. The wire is doubled at the last-mentioned bend and also for a short distance along the shank adjacent to its end, and is then bent outwardly to form one side of the loop 16, the other side of which is formed by bending the wire inwardly and fastening the end thereof to the shank. The pin 6 is formed by one end of the other wire, the other end of said wire terminating in the guard 8. That portion of the wire which forms the shank 7 is bent around the two branches of the loop adjacent to the shank 5, and also around the looped portion 17, whereby the attaching pin is rigidly made fast to said shank.

By constructing the device as herein described, it can be cheaply and readily manufactured, and by arranging the several parts constituting the device as specified, the device is made to effectually serve the purpose for which it is designed.

I claim:

A spool holder comprising a shank having an intermediate looped portion and outward bends at its ends, one of said bends carrying a spindle on which the spool is adapted to be supported, said spindle extending parallel to the shank, and the other bend being formed with a guard engageable by the free end of the spindle, the material forming the last-mentioned bend and a portion of the shank adjacent thereto being doubled, and one of the strands forming said doubled portion of the shank being bent downwardly from the shank and back thereto and secured to the shank to form a loop extending outwardly from the shank at an angle to and below the plane of the aforesaid bends, and a pin for attaching the holder to a garment, said pin being formed of a single piece of wire and having a shank which is bent around the two branches of the aforesaid loop adjacent to the first-mentioned shank, and around the intermediate looped portion thereof, the ends of the wire being bent outwardly from the shank to form the pin and a pin guard, respectively.

In testimony whereof I affix my signature in presence of two witnesses.

CHARLIE E. TALMON.

Witnesses:
W. K. DIX,
THOS. C. BENSON.

Copies of this patent may be obtained for five cents each, by addressing the "Commissioner of Patents, Washington, D. C."